(12) United States Patent
Ikeda et al.

(10) Patent No.: US 6,387,158 B2
(45) Date of Patent: May 14, 2002

(54) METHOD OF REMOVING MOISTURE IN GAS SUPPLY SYSTEM

(75) Inventors: Nobukazu Ikeda; Akihiro Morimoto; Yukio Minami; Teruo Honiden; Kouji Kawada; Katunori Komehana; Touru Hirai; Michio Yamaji, all of Osaka (JP)

(73) Assignee: Fujikin Incorporated, Osaka (JP)

( * ) Notice: Subject to any disclaimer, the term of this patent is extended or adjusted under 35 U.S.C. 154(b) by 0 days.

(21) Appl. No.: 09/848,208

(22) Filed: May 4, 2001

Related U.S. Application Data

(63) Continuation of application No. PCT/JP00/06209, filed on Sep. 11, 2000.

(30) Foreign Application Priority Data

Sep. 13, 1999 (JP) .......................................... 11-258547

(51) Int. Cl.[7] ................................................ F17D 3/14
(52) U.S. Cl. ............................. 95/97; 95/284; 34/437; 34/516
(58) Field of Search ................................ 95/19, 95, 96, 95/97, 103, 104, 117, 122, 284; 34/402, 437, 516

(56) References Cited

U.S. PATENT DOCUMENTS

| | | | | |
|---|---|---|---|---|
| 3,800,507 A | * | 4/1974 | Howell et al. | |
| 4,326,858 A | * | 4/1982 | Benkmann | |
| 4,351,732 A | * | 9/1982 | Psaras et al. | ................ 210/689 |
| 4,711,645 A | * | 12/1987 | Kumar | |
| 5,110,569 A | * | 5/1992 | Jain | .............................. 95/97 |

FOREIGN PATENT DOCUMENTS

| JP | 7-312344 A | * | 11/1995 |
|---|---|---|---|
| JP | 10-128024 A | * | 5/1998 |

* cited by examiner

Primary Examiner—Duane Smith
Assistant Examiner—Frank M. Lawrence
(74) Attorney, Agent, or Firm—Griffin & Szipl, P.C.

(57) ABSTRACT

A method of removing moisture efficiently in the gas supply system by evacuation at normal temperature without using the baking method. The method involves flowing a gas to remove moisture in the gas supply system with the flow pressure of the gas to remove moisture set at not lower than a minimum pressure at which the gas flow becomes viscous and not higher than a water saturated vapor pressure at a flow temperature of the gas to remove moisture. The gas to remove moisture achieves a viscous flow when a mean free path of gas molecules is smaller than a diameter of piping of the gas supply system. If the gas for removing moisture is evacuated at normal temperature under such conditions, the adsorbed moisture on an inside surface of the piping and in the valves and filters can be removed effectively.

12 Claims, 8 Drawing Sheets

Comparison of Vac + Ar on·off (intermittent purge) methods

METHOD OF REMOVING MOISTURE IN GAS SUPPLY SYSTEM

CROSS-REFERENCE TO RELATED APPLICATIONS

This application is a continuation of international application number PCT/JP00/06209, filed Sep. 11, 2000.

This application is related to and claims the early filing date of Japanese Patent Application JP 11-258547, filed Sep. 13, 1999, the entire disclosure of which is hereby incorporated by reference.

FIELD OF THE INVENTION

The present invention relates to a method of removing moisture in a gas supply system used in the manufacture of semiconductors, chemicals, precision machine parts and the like. More particularly, the present invention relates to a method of removing moisture in the gas supply system effectively by adjusting the flow pressure of the gas for removing moisture within a specific range without baking (heating) the gas supply system or by intermittently supplying the gas for removing moisture at specific intervals.

BACKGROUND OF THE INVENTION

Various kinds of high-purity gases are generally supplied to a gas supply system in semiconductor manufacturing facilities, chemical manufacturing facilities and the like. If semiconductors, chemicals and the like are to be manufactured with high efficiency and purity, it is essential to keep impurities from getting into high-purity gases.

However, when the gas supply system is opened to the atmosphere as in the inspection of the facilities and the suspension of manufacture, air, moisture and other impurities flow into the system.

Those impurity gases are adsorbed on the inside surface of the piping and other component parts such as various valves and filters. The filter in particular is large in adsorption area and the adsorbed impurity molecules are difficult to remove.

Previously, impurity gases adsorbed inside the gas supply system were removed by purging the inside of the gas supply system with a high-purity gas for a long time, or baking the gas supply stem from outside.

Since an $H_2O$ molecule in particular is stronger than other adsorbed molecules in adsorbability, baking is considered to be the most effective way of removing impurity gases.

Whether the impurity gases have been removed is generally judged in a way that the main components in the evacuated gas are compared before and after the baking. The largest impurity gas before baking is $H_2O$. In baking, water decreases drastically as compared with other gases. In other words, moisture is a gas very difficult to remove by evacuation at normal temperature, but is easy to remove by baking.

However, baking often has adverse effects on the gas supply system. For example, because of high temperature, materials deteriorate in physical properties. Due to an increase in diffusion coefficient in the solid, segregation, thermal decomposition, or the like, occur. In particular, the gas supply system itself is often so designed that it should not be baked. In such a case, the system cannot be baked.

SUMMARY OF THE INVENTION

An general object of the present invention is to provide a method of removing impurity gases efficiently without baking. A first specific object of the present invention is to provide a method of removing moisture in a gas supply system in which adsorbed moisture can be removed effectively by evacuation at normal temperature.

A second specific object of the present invention is to provide a method of removing moisture in the gas supply system in which adsorbed moisture can be effectively removed by maintaining the flow pressure of the gas for removing moisture within a specific range.

A third specific object of the present invention is to provide a method of removing moisture in the gas supply system in which adsorbed moisture can be removed efficiently by evacuation at normal temperature even if the gas supply system is a complicated one having valves, filters, pressure regulators, flow regulators, etc.

A fourth object of the present invention is to provide a method of removing moisture in the gas supply system in which moisture can be removed effectively by evacuation at normal temperature even in a gas supply system of a complicated construction by stopping and allowing, at specific intervals, the flow of the moisture-removing gas without regulating the flow rate of the gas for removing moisture in a meticulous manner.

The present invention solves the above problems. As described more fully below, the present invention is to a method of removing remaining moisture in a gas supply system in which the flow pressure of the gas for removing moisture is set at not lower than a minimum pressure where the gas flow becomes a viscous flow and not higher than a water-saturated vapor pressure, which is the basic principle of the present invention.

A feature of the present invention is that a condition allowing the gas for removing moisture to be a viscous flow is that the mean free path of gas molecules be smaller than the diameter of the piping of the gas supply system.

The gas supply system from which moisture is removed may be either a gas supply system of a relatively simple construction having filters and valves or one of a relatively complicated construction having filters, pressure regulators, flow regulators, valves, etc.

Also, the gas supply system may be a gas supply system provided with an evacuation port for the gas for removing moisture at an end of the gas supply system and another on an upstream side of the flow regulator.

Meanwhile, the basic principle of the present invention is a method of removing moisture remaining in the gas supply system by flowing the gas for removing moisture in the gas supply system in which the inside of the gas supply system is evacuated continuously and at the same time the moisture-removing gas to be supplied into the gas supply system is stopped and allowed to flow at specific intervals.

While the moisture removing gas to be supplied into the gas supply system is stopped, moisture is removed with high efficiency by evacuating to bring the flow pressure of the gas for removing moisture in the gas supply system to a pressure value between the minimum pressure where the gas flow becomes a viscous flow and the water saturated vapor pressure at the flow temperature of the gas for moving moisture.

The supply pressure of the moisture removing gas to be supplied in the gas supply system is brought to between 100–4,500 Torr. As a result, while the supply of gas for removing moisture is stopped, the flow of the gas for removing moisture in the gas supply system is a viscous flow without fail and the gas pressure in the gas supply system is not higher than the water vapor pressure in the gas supply system is not higher than the water vapor pressure, thereby facilitating the desorption and removal of the adsorbed water molecules efficiently. Thus, the desorbed water molecules are driven out by the supply of the gas for removing moisture that follows, and the moisture is removed more efficiently.

Further, the moisture removing gas from the supply source can be supplied into the gas supply system without adjusting the gas flow rate on a primary side of the gas supply system. This further simplifies the moisture removing process.

The moisture-removing gas to be supplied into the gas supply system is allowed to flow preferably for 0.9 to 5 seconds and is stopped for 0.3 to 175 seconds alternately. This further improves the moisture-removing efficiency.

LIST OF REFERENCE LETTERS

Figure 1:
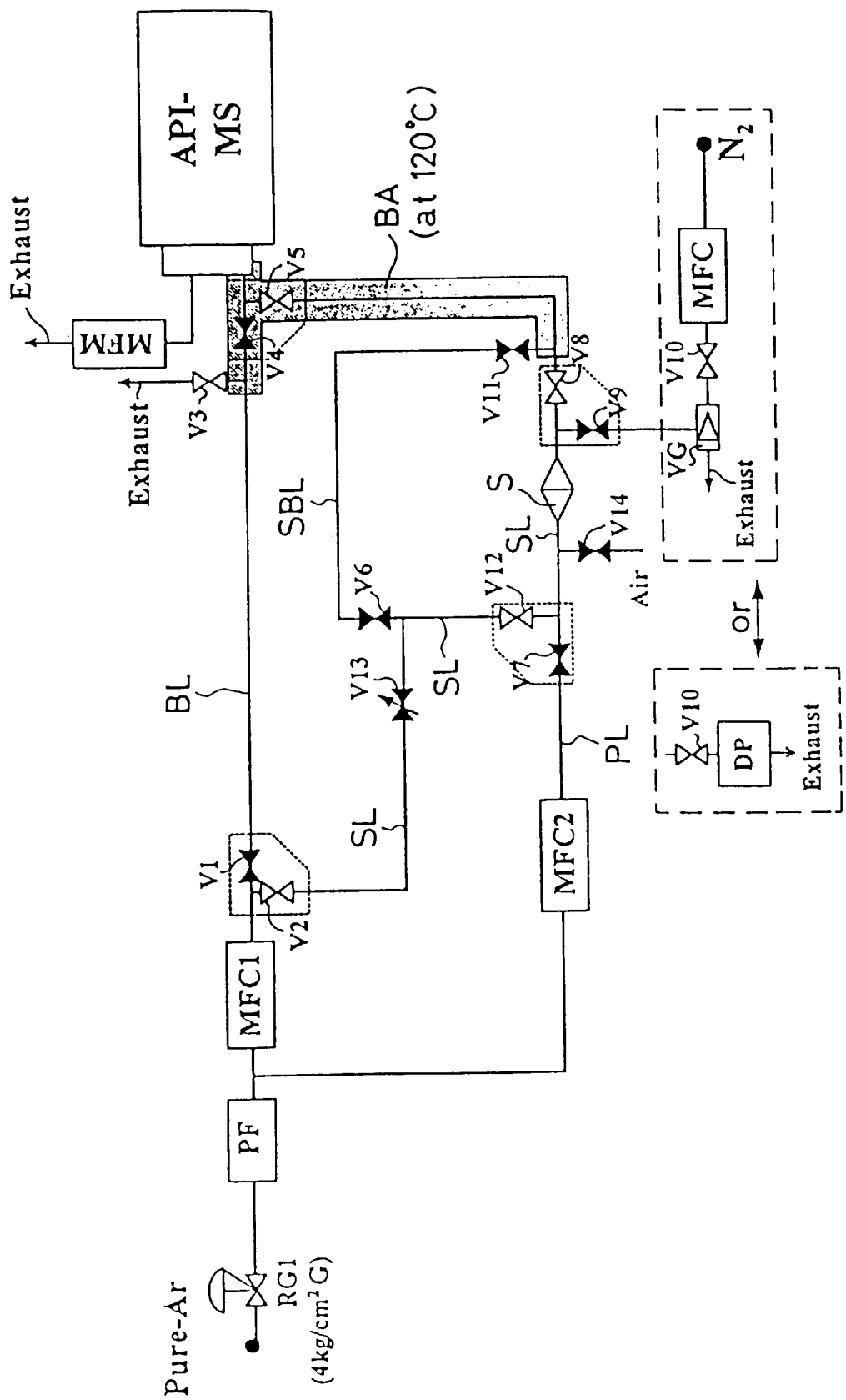
FIG. 1 is a constitutional diagram of a gas supply system according to Embodiment 1 of the present invention.

| RG1 | pressure regulator |
|---|---|
| PF | gas purifier |
| MFC1 | mass flow controller |
| MFC2 | mass flow controller |
| MFC3 | mass flow controller |
| MFC4 | mass flow controller |
| MFM | mass flow meter |
| V1–V19 | valves |
| API-MS | atmospheric ionized gas mass analyzer |
| DP | dry pump |
| VG | vacuum generator |
| BL | bypass line |
| SL | sample line |

-continued

| SBL | sample bypass line |
|---|---|
| PL | purge line |
| BA | baking area |

Abbreviations Used Herein

| SLM | liter/minute in a standard state |
|---|---|
| vac | evacuation |
| sccm | cm$^3$/minute in a standard state |
| sccs | cm$^3$/second in a standard state |

DESCRIPTION OF THE PREFERRED EMBODIMENTS

After extensive research and development of a method of removing moisture in a gas supply system by means other than heating, it was discovered that moisture can be removed efficiently by adjusting the flow pressure of the gas for removing moisture.

If the gas supply system is evacuated while the gas for removing moisture is flowed in the gas supply system, the gas molecules flow, hitting the inside surface of the piping and the complicated inside surface of the filter. The inside surface has water molecules sticking to it. When the gas molecules collide against the water molecules to exchange energy, the water molecules flow and are evacuated by the energy gained. The gas molecules also have to be evacuated.

If the gas molecules that have slowed down after the crushing can collide against other gas molecules, the collision allows the gas molecules to accelerate and make them flow and be evacuated. In other words, to evacuate both the gas and water molecules, the gas molecules need to hit water molecules on the inside surface and further collide frequently against each other.

To have this phenomenon materialize, it was discovered that it is necessary to utilize the Knudsen number. The Knudsen number K is given as follows: K=L/D (L: mean free path; D: representative length of an object). In the present invention, the representative length D may be a piping diameter.

If the Knudsen number K is smaller than 1, that is, the mean free path L is smaller than the piping diameter D, moisture-removing gas molecules easily collide with each other. This range of about 0.01<K<1.00, is called a slip flow, that is, it is believed that the gas flow slides on the inside surface of the piping. Therefore, L≦D is one of the conditions required in the present invention. In the present invention, a fluid in which L≦D is achieved is called a viscous flow.

On the other hand, if K>1, that is, L>D, the collision between the gas molecules decreases in frequency. Under this condition, if the gas molecules and water molecules collide with each other, evacuating the water molecules, the re-collision of the gas molecules is low in probability. As a result, the gas molecules are adsorbed on the inside surface. A fluid in which these conditions prevail is called molecular flow in the present invention.

In the present invention, therefore, it is essential that a viscous flow prevail. Generally, the mean free path L is given by L=1√2πd$^2$n (d:diameter of molecule; n:molecule number density). The molecule number density n is n∝P (P:gas flow pressure), and therefore L=k/P (k:proportional coefficient).

The proportional coefficient k is different depending on the kind of gas. With air at 20° C., L=4.98×10$^{-3}$/P. Here, the system of units L (cm) and P (Torr) are used, i.e., for P=10$^{-3}$ (Torr), L=5 (cm). For P=10$^{-2}$ (Torr), L=0.5 (cm). For P=10$^{-1}$ (Torr), L=0.05 (cm).

If the piping diameter D is 0.5 (cm), for example, it is required that L≦D be established if the flow becomes a viscous flow. That is, it is required that the following pressure conditions be met: P≧10$^{-2}$ (Torr). Therefore, the conditions under which the flow becomes a viscous flow mean setting the lowest limit of the gas flow pressure.

Next, the highest limit of gas flow pressure P has to be given. It is found that this highest limit condition is the same as the condition under which the moisture adsorbed on the inside surface evaporates within the piping. If the gas flow pressure in the piping is not higher than the saturated vapor pressure Pw of water, moisture could evaporate. Therefore, if P≦Pw, adsorbed moisture can evaporate. The saturated vapor pressure Pw of water over a temperature range from 0 to 150° C. is shown in Table 1.

FIG. 1 is a schematic diagram of the gas supply system according to the first embodiment. Pure argon gas (Ar) is used as the gas for removing moisture. The essential point of the present invention is that the flow pressure conditions under which moisture can be removed at 20° C. are 10$^{-2}$ (Torr)≦P≦17.5 (Torr). At P<10$^{-2}$ (Torr), the flow becomes a molecular flow. At P>17.5 (Torr), the saturated vapor pressure is exceeded and moisture cannot be removed.

A pressure regulator RG reduces Ar gas with a pressure of 4 (kg/cm$^2$G) to a desired pressure level and supplies the gas. A gas purifier PF removes impurities in the gas. Mass flow controllers MFC1 MFC2 and MFC can control the flow rate of the gas flow within any pressure range and flow rate range. Also, a mass flow meter MFM can measure the gas flow rate within a specific range.

Valves V1–V14 are used to open and close the gas flow. As a sample S, any member can be used but in the present example, a gas filter is used.

An API-MS is an atmospheric ionized gas mass analyzer and specifies the kinds of components contained in the gas and their specific gravity ratio.

TABLE 1

Vapor pressure of water from 0 to 150° C. (in Torr)

| Temp. (° C.) | 0 | 1 | 2 | 3 | 4 | 5 | 6 | 7 | 8 | 9 |
|---|---|---|---|---|---|---|---|---|---|---|
| 0 | 4.581 | 4.925 | 5.292 | 5.683 | 6.099 | 6.542 | 7.012 | 7.513 | 8.405 | 8.609 |
| 10 | 9.208 | 9.844 | 10.518 | 11.232 | 11.988 | 12.788 | 13.635 | 14.531 | 15.478 | 16.479 |
| 20 | 17.536 | 18.651 | 19.828 | 21.070 | 22.379 | 23.758 | 25.211 | 26.741 | 28.351 | 30.045 |
| 30 | 31.827 | 33.699 | 35.667 | 37.733 | 39.903 | 42.180 | 44.569 | 47.074 | 49.700 | 52.452 |
| 40 | 55.33 | 58.35 | 61.51 | 64.82 | 68.28 | 71.89 | 75.67 | 79.62 | 83.74 | 88.05 |
| 50 | 92.55 | 97.24 | 102.13 | 107.23 | 112.55 | 118.09 | 123.87 | 129.88 | 136.15 | 142.66 |
| 60 | 149.44 | 156.50 | 163.83 | 171.46 | 179.38 | 187.62 | 196.17 | 205.05 | 214.27 | 223.84 |
| 70 | 233.77 | 244.07 | 254.74 | 265.81 | 277.29 | 289.17 | 301.49 | 314.24 | 327.45 | 341.11 |
| 80 | 355.26 | 369.89 | 385.03 | 400.68 | 416.86 | 433.58 | 450.87 | 468.72 | 487.17 | 506.21 |
| 90 | 525.87 | 546.17 | 567.11 | 588.72 | 611.01 | 634.00 | 657.70 | 682.14 | 707.32 | 733.27 |
| 100 | 760.00 | 787.54 | 815.89 | 845.09 | 875.14 | 906.07 | 937.90 | 970.64 | 1004.32 | 1038.96 |
| 110 | 1074.6 | 1111.2 | 1148.8 | 1187.5 | 1227.2 | 1268.0 | 1309.9 | 1353.0 | 1397.2 | 1442.6 |
| 120 | 1489.1 | 1536.9 | 1586.0 | 1636.3 | 1687.9 | 1740.8 | 1795.0 | 1850.7 | 1907.7 | 1966.1 |
| 130 | 2026.0 | 2087.4 | 2150.3 | 2214.6 | 2280.6 | 2348.1 | 2417.2 | 2488.0 | 2560.4 | 2634.5 |
| 140 | 2710.4 | 2788.0 | 2867.4 | 2948.5 | 3031.6 | 3116.5 | 3203.3 | 3292.0 | 3382.7 | 3475.3 |
| 150 | 3570.1 | | | | | | | | | |

Source: Manufacturing Chemists Association Research Project on "Selected Values of Properties of Fluids," Tables 2-1-(1.01)-K, Texas A & M University, College Station (1964).

At 20° C., Pw=17.5 (Torr). If the gas for removing moisture is air, the gas flow pressure P at which moisture can be removed ranges between 10$^{-2}$ (Torr)≦P≦17.5 (Torr). Other gases used for removing moisture are not much different in this pressure range.

The gas becomes a molecular flow when P<10$^{-2}$ (Torr). To remove moisture, therefore, it is not necessary to raise a high degree of vacuum. An ordinary vacuum pump will do.

Therefore, the flow can be made viscous by a dry pump DP, or a vacuum generator VG in which a Venturi tube is utilized. It is easy to acheive a viscous flow, but it is necessary to watch the pressure of the gas flow so that the flow pressure in the piping is made lower than the saturated vapor pressure Pw.

A variety of gases can be used as the gas for removing moisture, including helium (He), neon (Ne), argon (Ar) and nitrogen (N$_2$). Especially, inert gases which are low in reactivity and hardly re-adsorb on the gas supply system are the most suitable as the gas for removing moisture.

Embodiment 1

There will now be described in detail a first example of removing moisture in a gas supply system according to the present invention.

A valve V9 can be provided with two kinds of vacuum pumps selectively. One is a dry pump DP that can evacuate the gas flow pressure to 10$^{-3}$ (Torr) and is adjustable to reduce to several hundred Torr by controlling the flow rate of flow from the upstream. The other is a Venturi type vacuum generator VG and the attainable pressure is up to 60 (Torr). That is, the pressure adjustable range reached by evacuation is up to 60 (Torr). The pressure can be adjusted up to several hundred Torr by controlling the flow rate of flow from the upstream. Therefore, the dry pump DP can cover the molecular flow area, the area of the present invention and the area exceeding the saturated vapor pressure. But the vacuum generator VG can test the area exceeding the saturated vapor pressure only.

The vacuum generator VG is so constructed that, while the flow rate of N$_2$ is controlled by the mass flow controller MFC, evacuation is effected. The pressure attainable is up to 60 (Torr), as mentioned above.

The piping of the gas supply system comprises a bypass line BL, a sample line SL, a sample bypass line SBL, a purge line PL and a baking area BA. In the present example, the bypass line BL and sample bypass line SBL are to flow high-purity gas constantly not to raise the background of the analyzer and to flow high-purity gas when the background of the sample line is checked. The lines BL and SBL are not for the actual purging. Therefore, the valves V1, V3, V4, V6 and V11 are normally closed.

While the gas flows, the baking area BA is always heated to 120° C. and no adsorbed moisture remains. Moisture generation in the area is prevented. It is also so designed that, when the remaining gas is measured, the moisture is hard to adsorb.

To put the initial moisture absorption condition on an equal footing in many tests, the valves V7, V8, V12, V9 are first closed and the valves V10 and V14 are opened to open the piping. Then, the valve V9 is opened and while the air is sucked, the piping is evacuated for 3 minutes. The valve V10 is then closed to return the piping pressure to atmospheric pressure. This condition is maintained for a specific time to have the same amount of moisture adsorbed in the piping.

During this operation, the valves V2, V13, V6, V11, V5 are opened while the valves V1, V4 and V12 are closed to flow Ar gas through the sample bypass line SBL at the rate of 1.2 liters/minute to check the background.

Then, the valve 14 is closed and the valves V7, V9 and V10 are opened to allow Ar gas to flow at a specific pressure, whereby the adsorbed moisture in the sample S is removed by the vacuum pump for a specific time. After purging by this Ar gas, the valves V7, V9, V10 are closed and the valves V2, V5, V8, V12, V13 are opened, and the valves V6, V11 are closed to allow Ar gas through the sample line SL at rate of about 1.2 liter/min. At the same time, the baking area BA is heated to 120° C.

That is, the moisture in the sample S is removed at a specific pressure by the Ar gas purge through the purge line PL in the first stage. Ar gas is passed through the sample line SL in the second stage, and while the moisture content is measured by the atmospheric ionized gas mass analyzer API-MS, Ar gas is evacuated. This way, the efficiency of removing moisture by Ar gas purging is measured.

Figure 2:
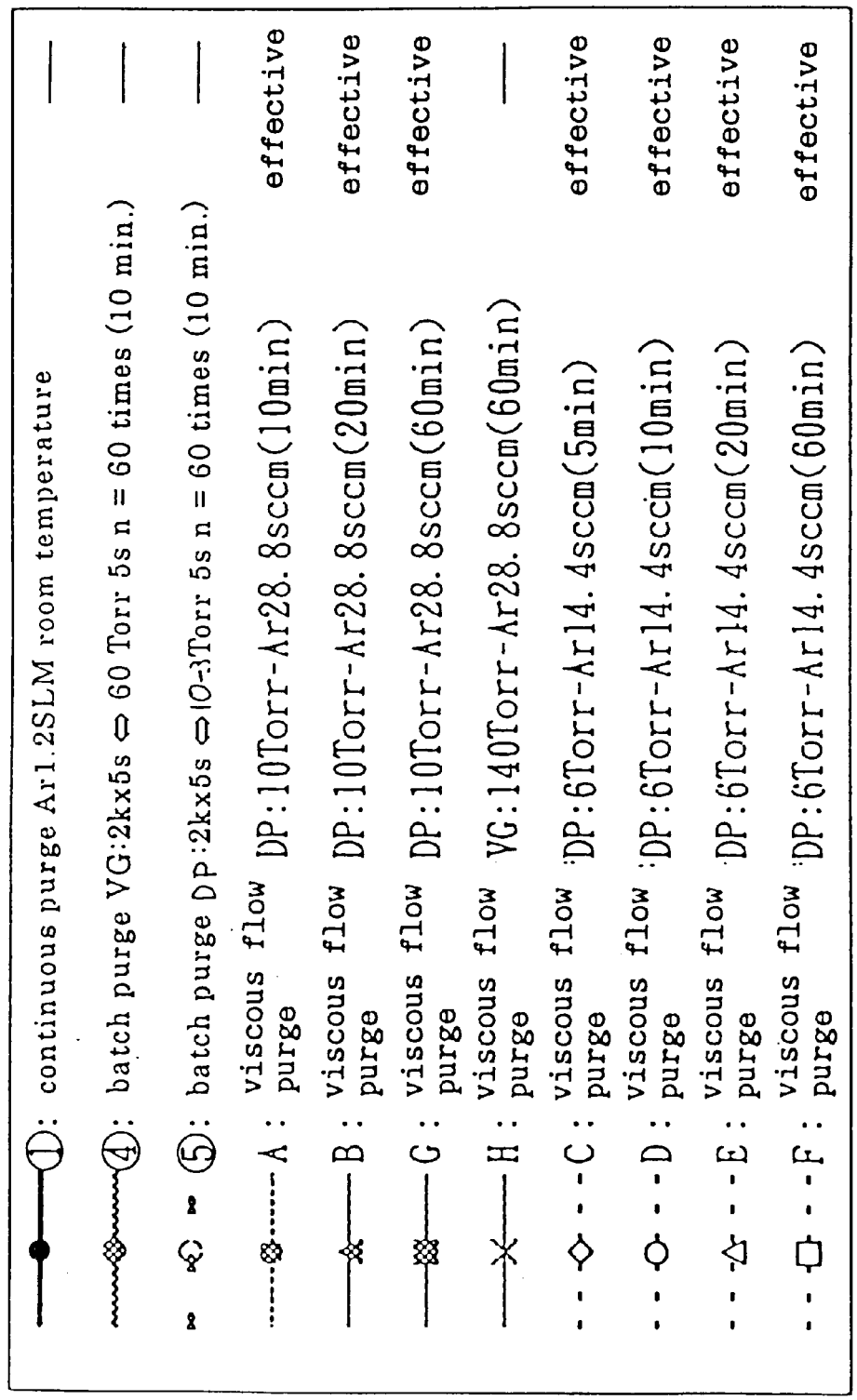
FIG. 2 is a detailed illustration of test examples embodying various physical conditions.

FIG. 2 is a detailed view of test examples. There are 11 test examples including (1), (4), (5), A–H. Test example (1) is for continuous purge measurement, while the other test samples (4), (5), A–H are for measurements conducted by combining the Ar gas purge in the first stage and allowing the Ar gas to pass through the sample line in the second stage.

The aforesaid continuous purge measurement is to purge (remove) moisture and to measure the moisture content at the same time. In other words, after the air is let in, the valves V7, V9, V10, V14, V6, V11, V1, V3, V4 are closed, while the valves V2, V13, V12, V8 and V5 are opened. Immediately after that, Ar gas is flowed through the sample line SL at the rate of 1.2 liter/min. And the moisture content is measured by the atmospheric ionized gas mass analyzer API-MS.

In the continuous purge measurement (1), Ar gas at room temperature (about 20° C.) is flowed at a rate of 1.2 SLM (liter/minute in standard state).

The batch purge in the test examples (4), (5) is moisture-removing purge in the first stage in which the gas pressure is switched. In the test example (4), for example, purging with Ar gas under pressure 2 (kgf.cm$^2$) is effected for 5 seconds using the vacuum generator VG and then for another 5 seconds the same way but at pressure 60 (Torr). Alterations between these 5 second purge steps are made (60 times for 10 minutes).

The time given in the parentheses in the test examples (4)—H indicates the time for purging to remove moisture.

After these purges, the moisture content is measured. The test examples (1), (4) are examples where the saturated vapor pressure of 17.5 (Torr) is exceeded. In test example (5), a switch is made between the area exceeding the saturation vapor pressure and the molecular flow area. Text examples A, B, C, D, E, F, G are in the areas where the flow is a viscous flow and pressure is below the saturated vapor pressure. Finally, test example H is in the area where the flow is a viscous flow but the pressure exceeds the saturated vapor pressure. That is, there are 7 test examples according to the present invention—A, B, C, D, E, F, G—and the other four examples are comparative examples.

Figure 3:
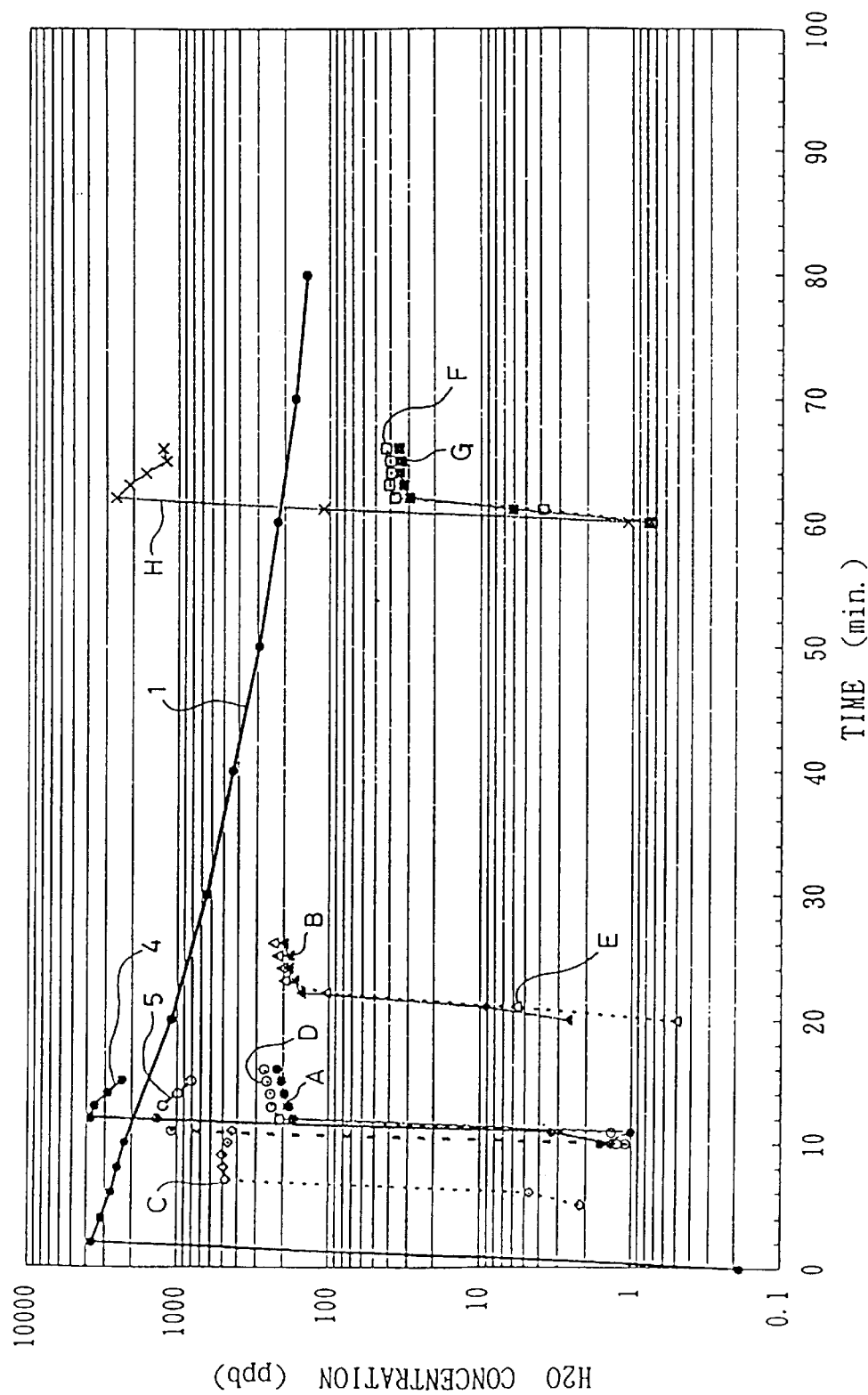
FIG. 3 is a comparative diagram of remaining moisture content after respective purges.

FIG. 3 is a comparative diagram showing the remaining moisture after various purges. Tests (1), (4), (5) and H are high in startup peak immediately after the start of measurement. It is thus shown that moisture removal by continuous purge and the first stage purge are not sufficient.

Test (5) is slightly lower than tests (1) and (4) in peak but higher than tests A to G. Specifically, test examples A to G of the present invention are lower than the other comparative examples in peak, showing that the moisture-removing purge in the first stage is effective.

As is evident from the difference Δ between the peak of test example (1) and the peak of test sample C, the moisture content drops to $\frac{1}{10}$. As shown, it is proven that if the purge pressure of the gas for removing moisture is set at the viscous flow area and below the saturated vapor pressure, moisture can be removed effectively.

Embodiment 2

Figure 4:
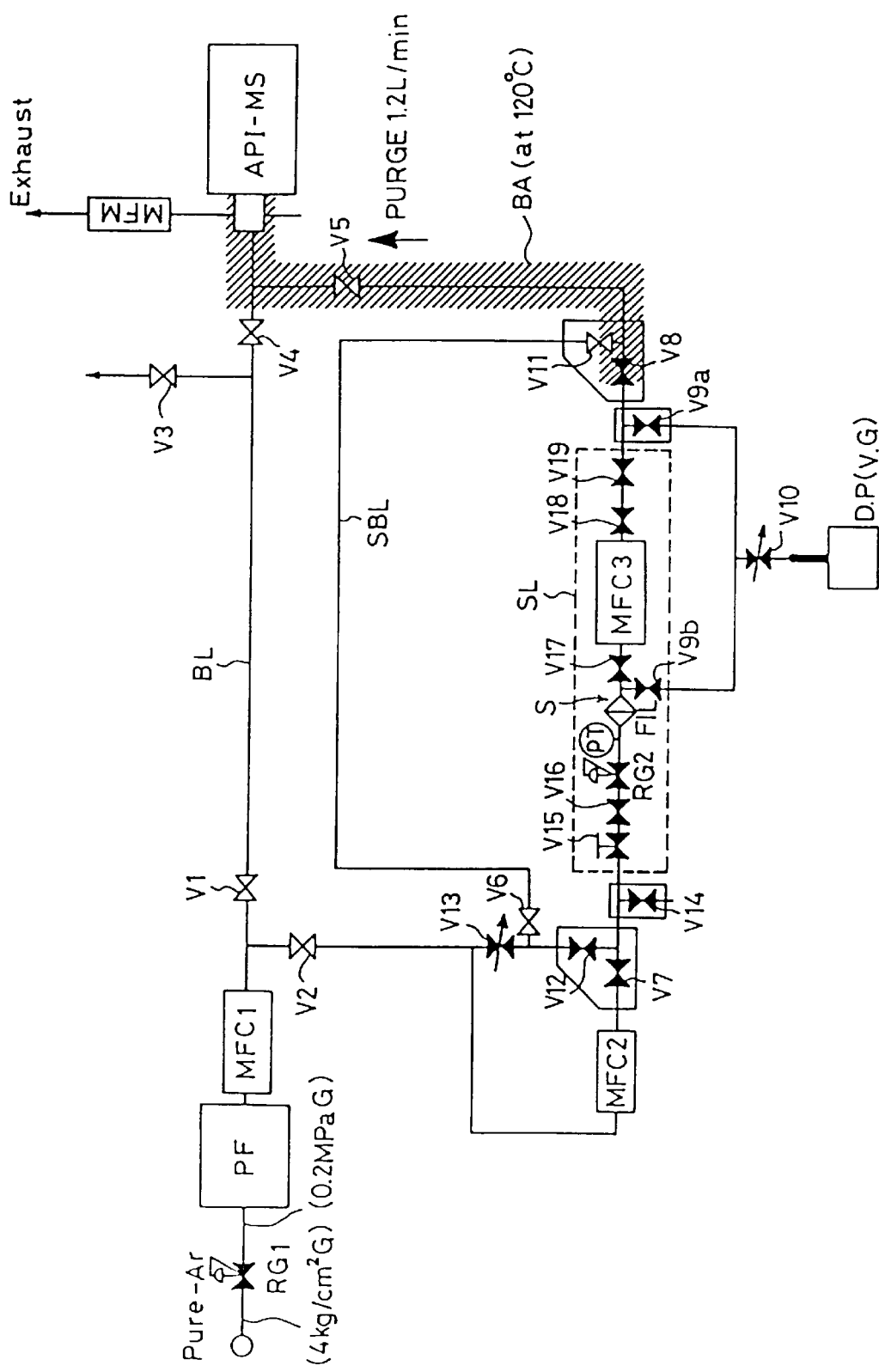
FIG. 4 is a constitutional diagram of a gas supply system according to Embodiment 2 of the present invention.

FIG. 4 is a schematic diagram of a gas supply system according to the second embodiment of the present invention. The difference between the schematic diagram of the gas supply system according to the first embodiment shown in FIG. 1 is that (1) the gas supply system is closer to the actual one having a filter FIL, a pressure regulator RG$_2$, a mass flow controller MFC3 and valves for a sample S (surrounded with dotted line in FIG. 4), and (2) evacuation can be effected at two points—on the upstream side of the mass flow controller MFC and at the end of the gas supply system.

It is noted that in FIG. 4, evacuation is effected at two points because the mass flow controller MFC3 for small flow rate is large in resistance in the inside flow path. However, in case the internal resistance in the mass flow controller MFC3 is small or the mass flow controller MFC 3 is not included or in case the dry pump DP is large in evacuation capacity, needless to say, the evacuation may be effected at one point through valve V9$a$.

In the gas supply system in FIG. 4, the Ar gas pressure is adjusted to 0.2 MPaG by the pressure regulator RG$_1$. The valves V7, V8, V12, V9$a$, V9$b$ are first closed and the valves V14, V15 to V16, V10 are opened to leave the inside of the piping open to the atmosphere. Then, while the valves V9$a$, V9$b$ are opened to suck the air in, the piping is evacuated. Thereafter, the valve V10 is closed to bring back the pressure inside the piping to atmospheric. This state is maintained for a specific time to let the same amount of moisture adsorb in the sample line SL.

During this operation, the valves V2, V13, V6, V11, V5 are opened, while the valves V1, V4, V12 are closed to flow the Ar gas to the sample bypass line SBL at the rate of 1.2 liter/min. and to check the background.

To effect the Ar gas purge in the first stage, the valve V14 is closed, while valves V7, V9$a$, V9$b$, V10, V15 to V19 are opened to flow the Ar gas at a specific pressure, whereby the adsorbed moisture in the sample line SL is removed by the vacuum pump for a specific time.

When the Ar gas purge in the first stage is over, then the measurement of moisture content in the second stage is carried out. For the measurement, the valves V7, V9a, V9b, V10 are closed, while valves V2, V5, V8, V12, V13, V15 to V19 are opened and the valves V6, V11 are closed to flow Ar gas through the sample line SL at the rate of 1.2 liters/min. At this time, the baking area BA is heated to 120° C. Then, while the Ar gas is evacuated through the valve V5, the moisture content is measured by the atmospheric ionized gas mass analyzer API-MS. This way, the efficiency of moisture removal by Ar gas purge is measured.

Figure 5:
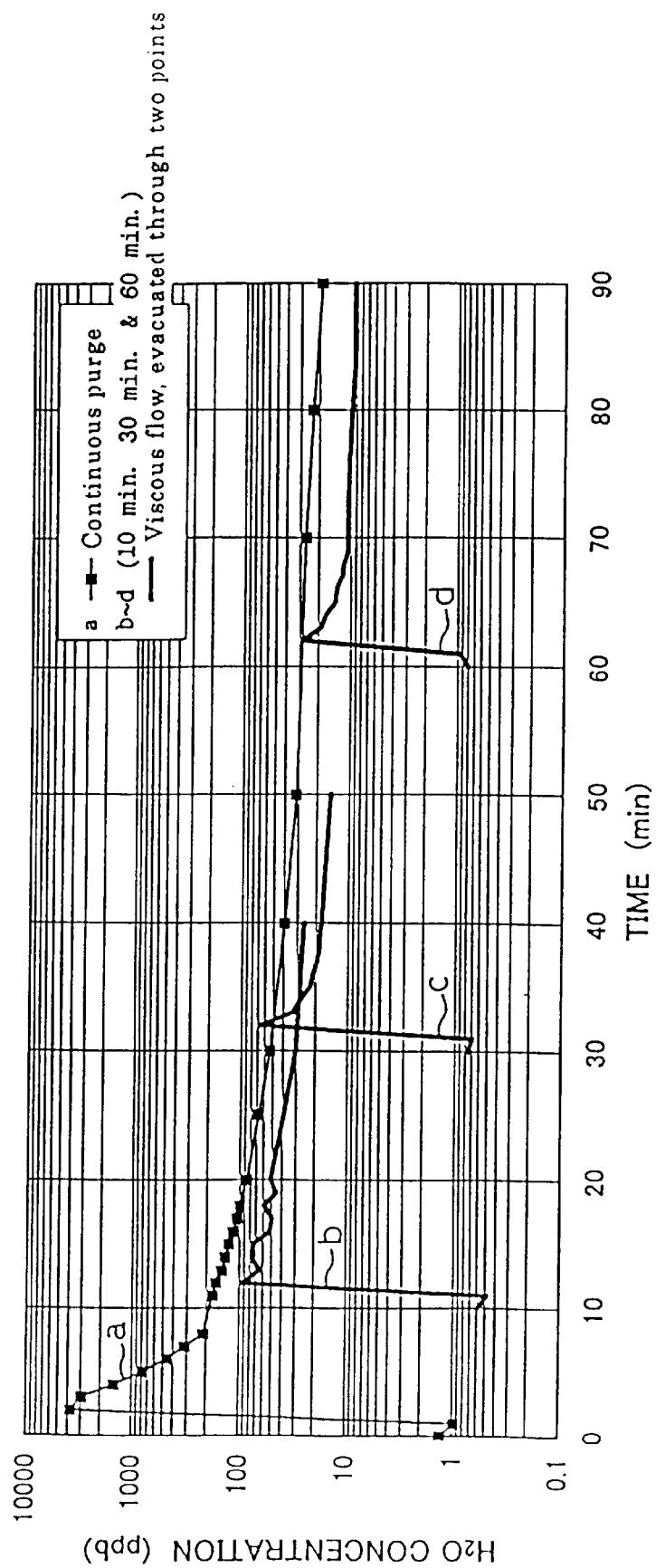
FIG. 5 is a comparative diagram showing remaining moisture concentrations in the gas supply system of FIG. 4 where viscous flow purges by evacuation at two points were carried out for 10, 30 and 60 minutes, respectively.

FIG. 5 shows the remaining moisture content after the Ar gas purge of the gas supply system in FIG. 4. The Ar gas purge is carried out with the Ar gas flow rate at 19.7 sccm and an internal pressure of the dry pump DP at 14.8 Torr.

In this case, the inside diameter of the piping is 4.4 mm and the pressure of the Ar gas is 14.8 Torr. That is, the aforesaid Ar gas purge is carried out under viscous flow conditions.

In FIG. 5, curve b, curve c and curve d indicate measurements of remaining moisture concentrations after the Ar gas purge in the first stage for 10, 30 and 60 minutes.

The curve a shows the remaining moisture concentration after continuous purging.

As a comparison between curve a and curves b, c and d shows, the remaining moisture of the b, c, and d decreases to about ½ that of curve a.

Embodiment 3

A third embodiment of the present invention will now be explained. No constitutional diagram of the supply system in which the third sample is applied is shown, but the arrangements are essentially the same as those in FIG. 4.

What is different is that (1) the valve V7 is so designed as to continuously open and close in a specific short cycle, and (2) the mass flow controller MFC2 is omitted.

The reason why the mass flow controller MFC2 is omitted is that there is no need in particular to adjust the flow rate of the Ar gas to be supplied in the first stage Ar gas purge (i.e., purging by supplying the Ar gas intermittently).

In the third embodiment, the same amount of moisture is first adsorbed in the piping under the same conditions as in Embodiments 1 and 2.

Also, Ar gas is flowed through the sample bypass line SBL at the flow rate of 1.2 liters/minute, and the background is checked.

Thereafter, to carry out the Ar gas purge in the first stage, the dry pump DP is actuated and the valves V7, V9a, V9b, V10, V15, V19 are opened while valves V8, V14, V12 are closed.

Then, the valve V7 is opened and closed in a specific cycle to stop and start the Ar gas supply to the gas supply system, thereby changing the pressure in the sample line SL between tens of Torr (60 Torr, for example) and several Torr (1 Torr, for example).

If the valve V7, for example, is closed in the valve opening and closing operation, the sample line SL is evacuated to a pressure of several Torr. As a result, the Ar gas flow enters the area of viscous flow and is reduced in pressure to a level lower than the saturated vapor pressure of water. The moisture is removed with high efficiency under the same conditions as in Embodiment 1.

If the valve V7 is opened instead, the Ar gas pressure within the sample line SL changes to tens of Torr (60 Torr, for example), getting out of the area of viscous flow. However, a large quantity of Ar gas flowing in when the valve V7 is opened efficiently forces out the water molecules as detached in the sample line SL.

Needless to say, the pressure, flow rate, etc. of the Ar gas to be supplied to the gas supply system are properly set depending on the constitution of the gas supply system, the capacity of the evacuation unit (dry pump DP) and the inside diameter of the piping path. The pressure is usually set at 100 to 4,500 Torr.

Figure 6:
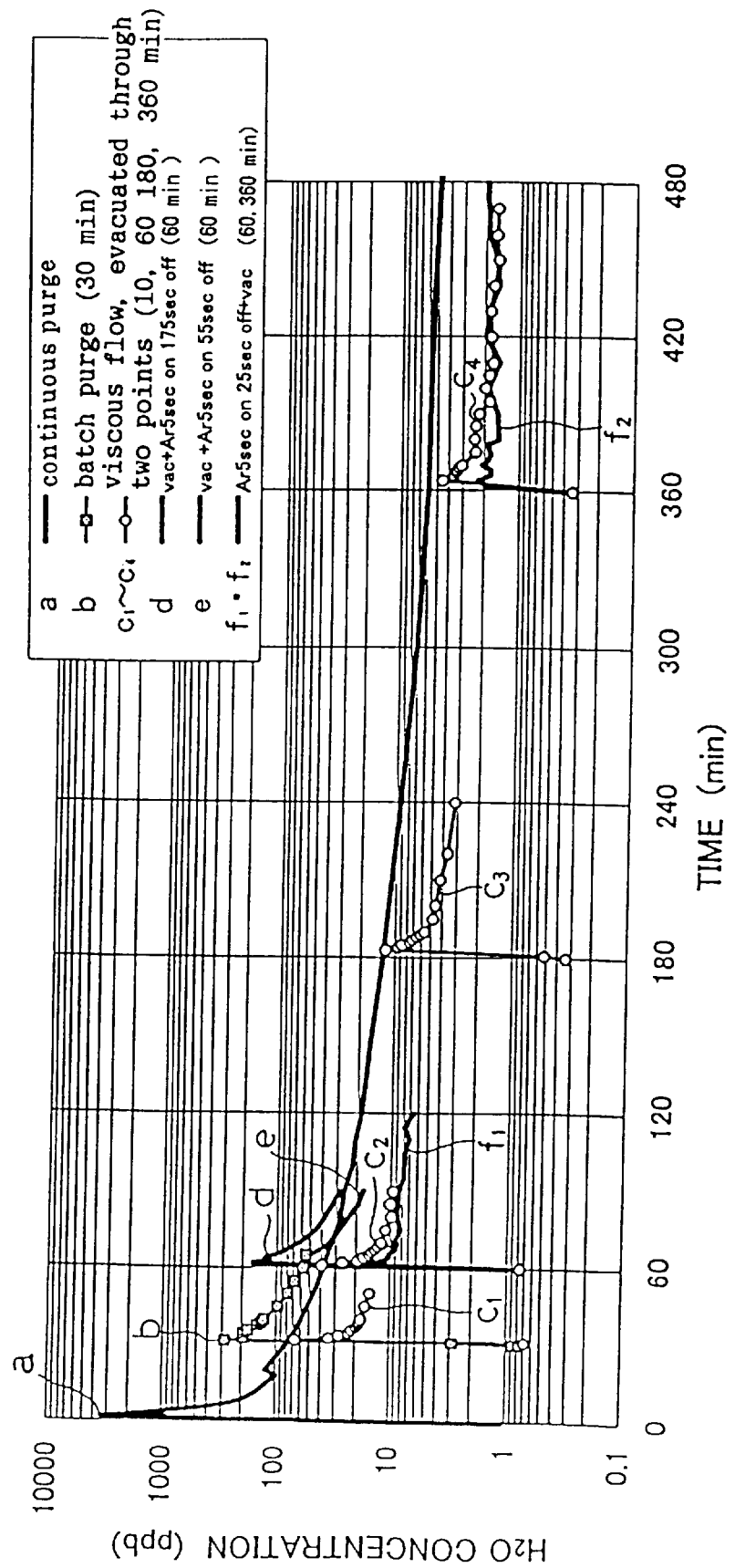
FIG. 6 is a comparative diagram showing remaining moisture concentrations in virtually the same gas supply system comparing purging methods: one method involving purging by stopping the supply of the gas for removing moisture and allowing the gas to flow, and other methods.

FIG. 6 shows the moisture concentrations remaining after moisture is removed by the third embodiment from the sample line SL of the same construction as that in FIG. 4. Curves d, e, $f_1$ and $f_2$ are measurements in Embodiment 3.

That is, the curve d is a measurement of the remaining moisture concentration in the first stage purge conducted so that, while the line is evacuated by the dry pump DP, the Ar gas is flowed for 5 seconds and stopped for 175 sec. This procedure is repeated 60 minutes.

The curve e is a measurement conducted so that Ar gas is flowed 5 seconds and stopped for 55 seconds. This procedure is repeated for 60 minutes. Curve $f_1$ is a measurement taken this way. The Ar gas is flowed for 5 seconds and stopped for 25 seconds, and this procedure is repeated for 60 minutes.

Similarly, the curve $f_2$ is a measurement conducted so that Ar gas is flowed for 5 seconds and stopped for 25 seconds, and this procedure is repeated for 360 minutes.

Meanwhile, the curves a, b, $C_1$–$C_4$ in FIG. 6 are shown for comparison. The curve a is a measurement taken with the line continuously purged with the Ar gas under identical conditions as the curve (1) in FIG. 3 in Embodiment 1 and the curve a in FIG. 5 in Embodiment 2.

The curve b in FIG. 6 is a measurement taken this way. A procedure comprising applying pressure with the Ar gas at 2 kf/cm² for 10 seconds and evacuation by the vacuum generator VG for 30 seconds (about 70 Torr) is repeated for 30 minutes (batch procedure).

Furthermore, the curves $C_1$–$C_4$ in FIG. 6 show remaining moisture concentrations measured the same way as in FIG. 5 in Embodiment 2. That is, the first stage purge is conducted for 30, 60, 180 and 360 minutes under the conditions that the Ar gas flow rate is 19.7 sccs at a pressure of 14.8 Torr (a viscous flow purge).

As is evident from the curve $f_2$ in FIG. 6, better moisture removing efficiency can be achieved in Embodiment 3 than by a viscous flow purge (curve $C_4$) in Embodiment 2.

Figure 7:
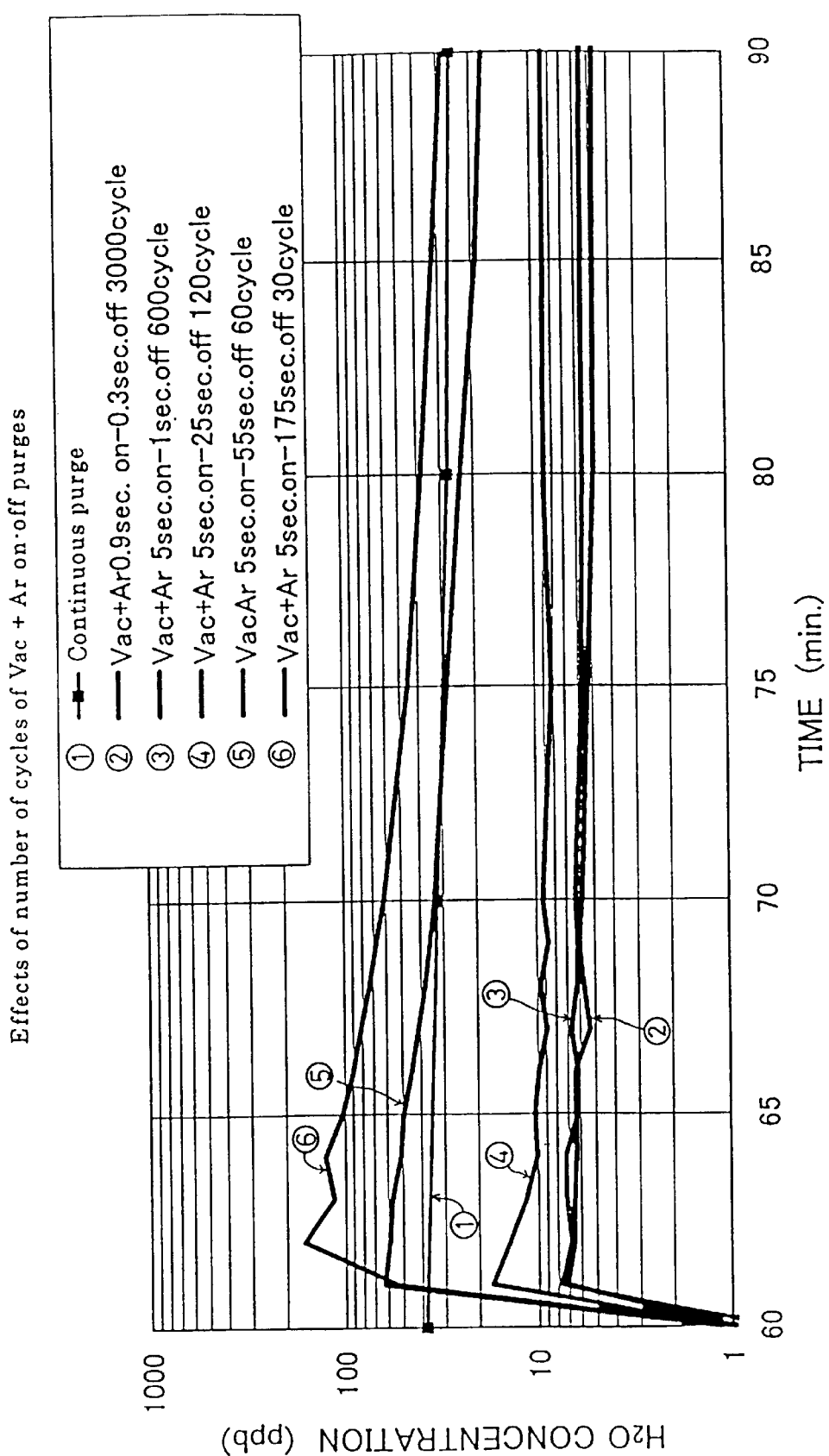
FIG. 7 is a comparative diagram showing remaining moisture concentrations in a purging method in which the supply of gas for removing moisture is stopped and restarted with variation in the number of cycles of stopping and allowing the flow to flow.

FIG. 7 shows changes in moisture removing efficiency observed when the number of the opening and closing cycles of the valve 7 is varied in Embodiment 3.

Curves (2) to (6) in FIG. 7 show measurements in remaining moisture concentration in the Ar gas in Embodiment 3. Curve (1), which is shown for comparison, shows a measurement of remaining moisture concentration within the Ar gas in case of continuous gas purge.

The curve (2) in FIG. 7, for example, is a measurement taken this way. With evacuation being conducted, the Ar gas is flowed for 0.9 seconds and stopped for 0.3 seconds. This procedure is repeated 3,000 times (for 60 minutes). After that, the moisture concentration in the Ar gas is measured continuously for 30 minutes.

As is evident from FIG. 7, a high moisture removing efficiency can be achieved when the number of cycles of the opening and closing of the valve V7 is increased.

Figure 8:
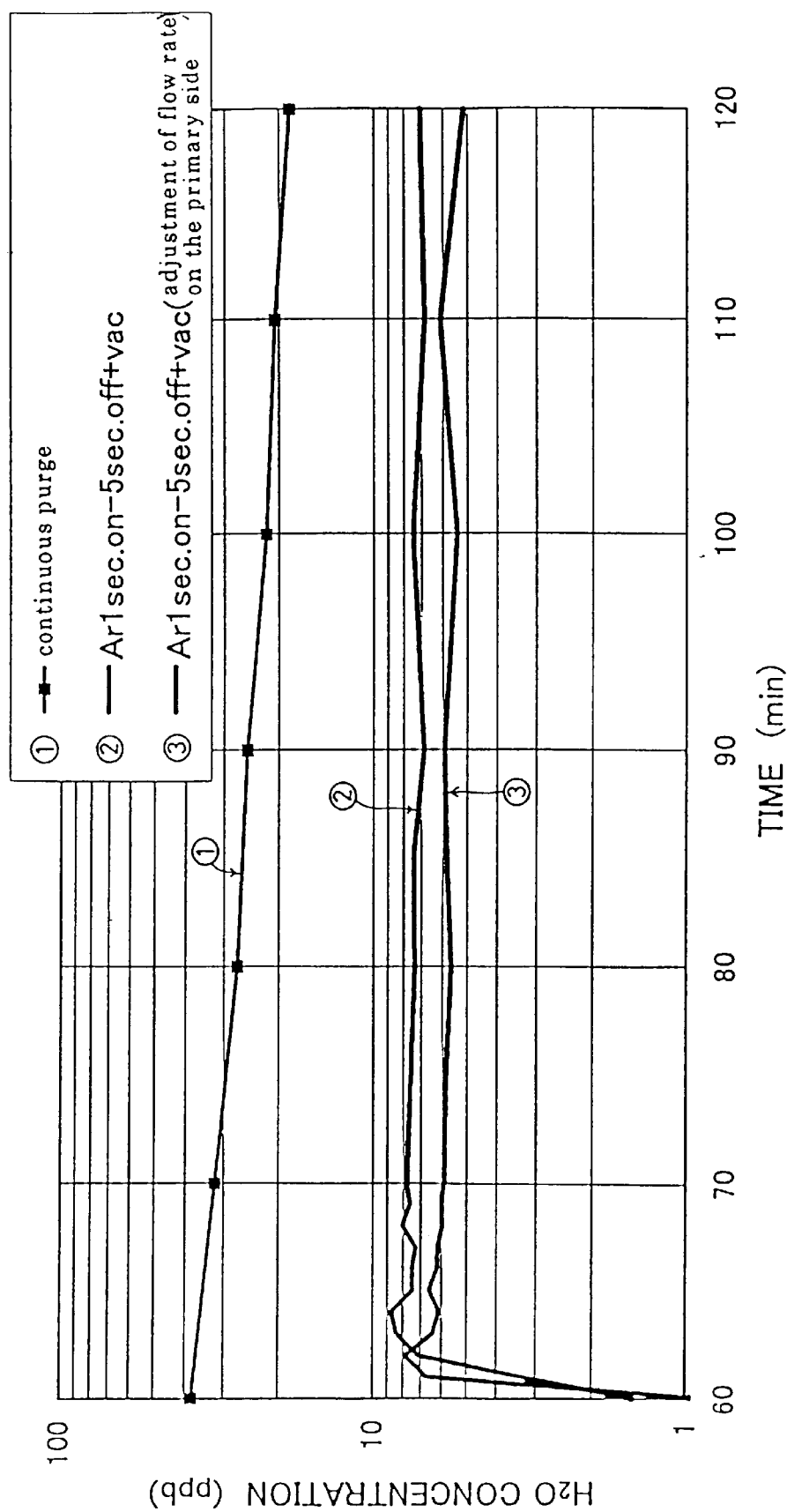
FIG. 8 is a comparative diagram showing remaining moisture concentrations in a purging method in which the supply of gas for removing moisture is stopped and restarted, wherein a comparison is made between two cases, one where the flow rate of the gas for removing moisture supplied from the primary side is adjusted and the other where no adjustment is made.

FIG. 8 compares the moisture removing efficiencies in Embodiment 3 of the present invention between the following cases: one where the flow rate of the Ar gas is so adjusted that the Ar gas supplied from the primary side becomes a viscous flow and the other case where the Ar gas is supplied to the sample line SL at the original flow rate initially adjusted on the supply source side with no adjustment made to the flow rate of the Ar gas for purge to be sent to the sample line SL (that is, without the mass flow controller MFC 2 in FIG. 4 provided).

As is evident from a comparison between the curve (2) and the curve (3) in FIG. 8, whether the flow rate of the Ar gas for purge to be supplied to the sample line SL is not adjusted or the flow rate is adjusted meticulously during purge so that the Ar gas flow becomes a viscous flow, about the same moisture removing efficiency can be achieved by switching the valve between opened and closed positions while supplying the Ar gas at some 0.2 MPaG (about 2300 Torr). In reality, the Ar gas supply pressure is set at 100 Torr to 4500 Torr (5 k/cm$^2$G).

The gas supply systems according to the Embodiments 1 and 2 shown in FIGS. 1 and 4 are provided with the bypass line BL and the sample bypass line SBL. In the actual operation of removing moisture in the gas supply system, the bypass line BL and the sample bypass line SBL can be omitted.

According to one embodiment of the invention, the flow pressure of the gas for removing moisture is set at not lower than the lowest pressure at which the flow becomes a viscous flow and not higher than the saturated vapor pressure. Therefore, the collision of gas molecules can effectively remove moisture adsorbed on the inside surface of the gas supply system. Thus, an effective method of removing moisture without baking is established, especially for a part that should not be baked.

According to another embodiment of the invention, conditions for forming viscous flow are achieved by making the mean free path of gas molecules smaller than the piping diameter. Therefore, the minimum pressure that satisfies the conditions for viscous flow can be derived without difficulty.

According to a still further embodiment of the invention, inert gases such as Ar gas are selected as gas for removing moisture. Therefore, after moisture molecules are forced out, the gas itself will hardly be adsorbed in the supply system.

According to yet further embodiments of the invention, moisture inside the sample line can be removed efficiently whether the sample line is formed of such simple parts as a filter or a complicated piping system path having a filter, pressure regulator, mass flow controller and control valve.

According to a still further embodiment of the invention, even if the gas supply system includes equipment with large flow resistance, it is possible to easily maintain the flow gas pressure within the gas supply system higher than the lowest pressure at which the gas flow becomes a viscous gas flow and lower than the water saturated vapor pressure. Thus a more complicated gas supply system can be cleared of moisture.

According to other embodiments of the invention, moisture can be removed efficiently from a more complicated gas system without adjusting with high precision the flow rate of the gas for removing moisture supplied from the primary side. Moisture can be removed in a short time, simply and easily.

According to another embodiment of the invention, moisture can be removed efficiently in a still shorter time by increasing the number of cycles of stopping the flow of the gas removing moisture and allowing the gas to flow.

As set forth above, the present invention is excellent in practicability. The present invention is not limited to the embodiments and examples described above, and it is to be understood that changes and variations may be made without departing from the spirit or scope of the present invention.

What is claimed is:

1. A method of removing moisture remaining in a gas supply system having piping, comprising the steps of:
    providing a gas supply system having piping with inner surfaces;
    flowing an inert gas to remove moisture remaining on the inner surfaces of the piping of the gas supply system at a flow pressure; and
    setting the flow pressure of the inert gas to remove moisture at a flow pressure level not lower than the lowest pressure at which gas flow for the inert gas becomes viscous flow and not higher than a saturated vapor pressure of water at a flow temperature of the inert gas for removing moisture, wherein during viscous flow of the inert gas, a mean free path of the inert gas to remove moisture is smaller than a diameter of the piping of the gas supply system.

2. A method as defined in claim 1, wherein the gas supply system provided comprises a filter and valves.

3. A method as defined in claim 1, wherein the gas supply system provided comprises a filter, pressure regulator, flow regulator and valves.

4. A method as defined in claim 1, wherein the gas supply system provided has an evacuating port for the inert gas to remove moisture, and wherein the method further comprises evacuating the inert gas to remove moisture, wherein the evacuation of the inert gas to remove moisture occurs at the evacuating port.

5. A method as defined in claim 1, wherein the gas supply system provided has a flow regulator and multiple evacuating ports for the inert gas to remove moisture, wherein the multiple evacuating ports include a first port at an end of the gas supply system and a second port on an upstream side of the flow regulator, and wherein the method further comprises evacuating the inert gas to remove moisture, wherein the evacuation of the inert gas to remove moisture is effected at the first port and at the second port.

6. A method of removing moisture remaining in a gas supply system having an inside, comprising the steps of:
    flowing an inert gas to remove moisture remaining on inner surfaces of piping of a gas supply system having an inside, wherein the flow of the inert gas to remove moisture is a viscous flow and a mean free path of the inert gas to remove moisture is smaller than a diameter of the piping of the gas supply system;
    alternately stopping the flow of the inert gas to remove moisture at specific intervals; and
    applying a flow pressure of the inert gas to remove moisture inside the gas supply system when the flow of inert gas to remove moisture is stopped by continuously evacuating the inside of the gas supply system to a pressure level between a minimum pressure wherein the gas flow of the inert gas becomes viscous flow and a maximum pressure being a saturated vapor pressure of water at a flow temperature of the inert gas to remove water.

7. A method as defined in claim 6, further comprising:
    supplying the inert gas to remove moisture to the gas supply system without regulating gas flow on a primary side of the gas supply system.

8. A method as defined in claim 6, wherein the flow of the inert gas to remove moisture includes alternating flowing periods and stopping periods, wherein the flowing periods flow for a time between about 0.9 to 5 seconds, and the stopping periods stop flow for a time between about 0.3 to 175 seconds.

9. A method of removing moisture remaining in a gas supply system having piping, wherein the method removes moisture without the use of heat and comprises the steps of:

provid a gas supply system having piping with inner surfaces;

flowing an inert gas to remove moisture remaining on the inner surfaces of the metal piping of the gas supply system at a flow pressure;

setting the flow pressure of the inert gas to remove moisture at a flow pressure level not lower than the lowest pressure at which gas flow for the inert gas becomes viscous flow and not higher than a saturated vapor pressure of water at a flow temperature of the inert gas for removing moisture, wherein during viscous flow of the inert gas, a mean free path of the inert gas to remove moisture is smaller than a diameter of the piping of the gas supply system; and evacuating the inert gas to remove moisture, wherein the evacuation of the inert gas to remove moisture occurs at a first evacuating port for the inert gas to remove moisture of the gas supply system.

10. A method as defined in claim 9, wherein the gas supply system provided comprises a filter and valves.

11. A method as defined in claim 9, wherein the gas supply system provided comprises a filter, pressure regulator, flow regulator and valves.

12. A method as defined in claim 9, wherein the gas supply system provided has a flow regulator and a second evacuating port for the inert gas to remove moisture, wherein the first evacuating port is located at an end of the gas supply system and the second evacuating port is located on an upstream side of the flow regulator, and wherein the evacuation of the inert gas to remove moisture is effected at the first port and at the second port.

* * * * *